US011994997B2

(12) United States Patent
Guim Bernat et al.

(10) Patent No.: US 11,994,997 B2
(45) Date of Patent: May 28, 2024

(54) MEMORY CONTROLLER TO MANAGE QUALITY OF SERVICE ENFORCEMENT AND MIGRATION BETWEEN LOCAL AND POOLED MEMORY

(71) Applicant: Intel Corporation, Santa Clara, CA (US)

(72) Inventors: Francesc Guim Bernat, Barcelona (ES); Karthik Kumar, Chandler, AZ (US); Mark A. Schmisseur, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 641 days.

(21) Appl. No.: 17/132,431

(22) Filed: Dec. 23, 2020

(65) Prior Publication Data

US 2021/0117334 A1    Apr. 22, 2021

(51) Int. Cl.
*G11C 16/04* (2006.01)
*G06F 9/50* (2006.01)
(Continued)

(52) U.S. Cl.
CPC ........ *G06F 12/0882* (2013.01); *G06F 9/5016* (2013.01); *G06F 12/0238* (2013.01); *G06F 12/0835* (2013.01); *G06F 13/1668* (2013.01); *G06F 2209/5011* (2013.01); *G06F 2209/504* (2013.01); *G06F 2209/508* (2013.01)

(58) Field of Classification Search
CPC .................................................. G06F 12/0238
See application file for complete search history.

(56) References Cited

U.S. PATENT DOCUMENTS 11,455,239 B1 * 9/2022 Shah ..................... G06F 12/023
11,573,722 B2 * 2/2023 Subramanian ........ G06F 3/0604
(Continued)

FOREIGN PATENT DOCUMENTS

CN    110647480 A    1/2020

OTHER PUBLICATIONS

D. Jiang et al., "Introducing the Intel Data Streaming Accelerator (Intel® DSA)," <01.org/blogs/2019/introducing-intel-data-streaming-accelerator>, Nov. 20, 2019, 5 pages.
(Continued)

*Primary Examiner* — Pho M Luu
(74) *Attorney, Agent, or Firm* — Jordan IP Law, LLC

(57) ABSTRACT

Systems, apparatuses and methods may provide for a memory controller to manage quality of service enforcement and migration between local and pooled memory. A memory controller may include logic to communicate with a local memory and with a pooled memory controller to track memory page usage on a per application basis, instruct the pooled memory controller to perform a quality of service enforcement in response to a determination that an application is latency bound or bandwidth bound, wherein the determination that the application is latency bound or bandwidth bound is based on a cycles per instruction determination, and instruct a Direct Memory Access engine to perform a migration from a remote memory to the local memory in response to a determination that the quality of service cannot be enforced.

20 Claims, 6 Drawing Sheets

(51) Int. Cl.
   *G06F 12/02*       (2006.01)
   *G06F 12/0831*     (2016.01)
   *G06F 12/0882*     (2016.01)
   *G06F 13/16*       (2006.01)

(56) References Cited

U.S. PATENT DOCUMENTS

| 2018/0091383 | A1  | 3/2018 | Guim Bernat et al. |
| 2019/0034340 | A1  | 1/2019 | Doshi et al. |
| 2019/0042163 | A1  | 2/2019 | Guim Bernat |
| 2019/0065261 | A1  | 2/2019 | Narayan et al. |
| 2020/0293465 | A1  | 9/2020 | Yang et al. |
| 2022/0050722 | A1* | 2/2022 | Dugast .................. G06F 9/5016 |

OTHER PUBLICATIONS

Intel Corporation, "Top-Down Microarchitecture Analysis Method," <software.intel.com/content/www/us/en/develop/documentation/vtune-cookbook/top/methodologies/top-down-microarchitecture-analysis-method.html>, Dec. 17, 2020, 6 pages.

J. Russell, "IBM Debuts Power10; Touts New Memory Scheme, Security, and Inferencing," <hpcwire.com/2020/08/17/ibm-debuts-power10-touts-new-memory-scheme-security-and-inferencing/>, Aug. 17, 2020, 14 pages.

Extended European Search Report for European Patent Application No. 21209941.0 dated May 12, 2022, 10 pages.

* cited by examiner

MEMORY CONTROLLER TO MANAGE QUALITY OF SERVICE ENFORCEMENT AND MIGRATION BETWEEN LOCAL AND POOLED MEMORY

TECHNICAL FIELD

Embodiments generally relate to memory controllers. More particularly, embodiments relate to memory controller to manage quality of service enforcement and migration between local and pooled memory used in a data server environment.

BACKGROUND

As cloud-based use cases continue to grow, resource consolidation is an emerging requirement to improve efficiencies at scale in data centers. Pooled memory may be one technology used to meet this requirement. While the existing hooks for quality of service (QoS) may be useful in preserving memory bandwidth and/or resources for high priority processes or for a high priority tenant, there may still be a gap in addressing the classic problem of under/over provisioning of resources. For example, such existing provisioning may typically be done via static a priori provisioning. Additionally, how much application performance is impacted by memory bandwidth and latency may vary widely by application type.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
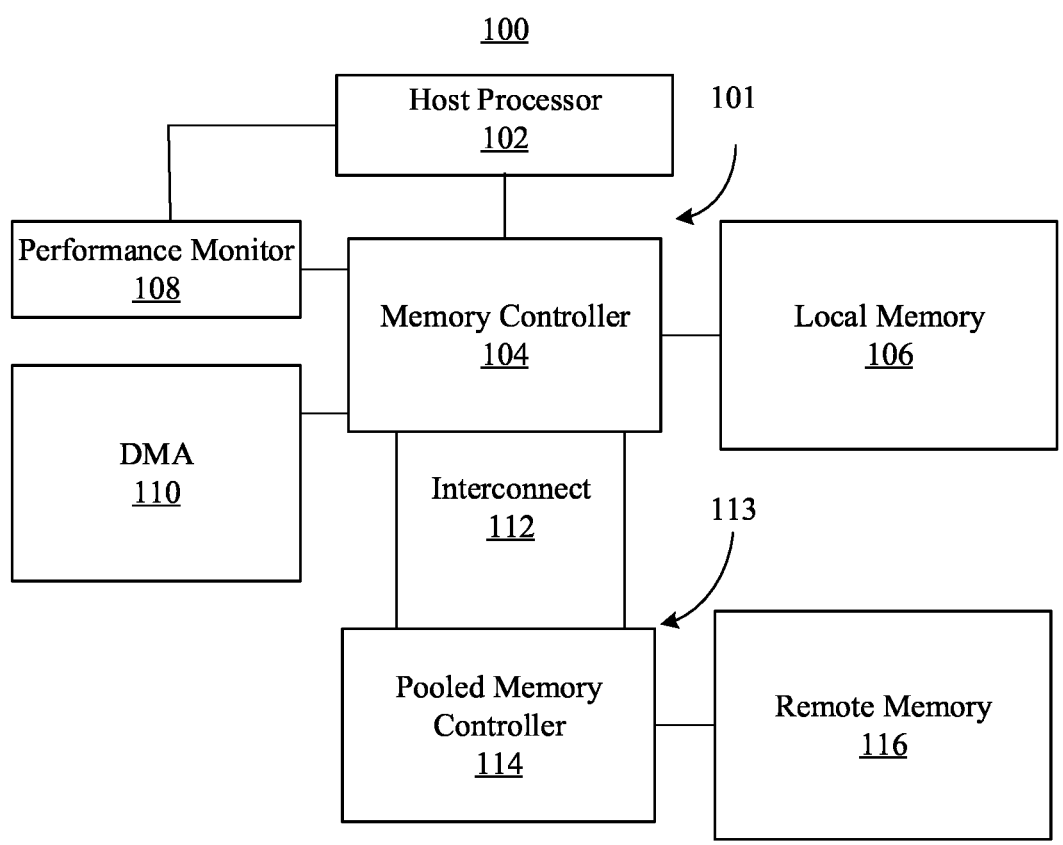
FIG. 1 is a block diagram of an example of a pooled memory management system according to an embodiment.

As discussed above, while the existing hooks for quality of service (QoS) may be useful in preserving memory bandwidth and/or resources for high priority processes or for a high priority tenant, there may still be a gap in addressing the classic problem of under/over provisioning of resources. For example, such existing provisioning may typically be done via static a priori provisioning. Such a static a priori provisioning of memory resources may be done irrespective of how much bandwidth/latency is needed to maintain a given performance level (e.g., cycles per instruction (CPI)) at every interval of time. Such a static a priori provisioning typically cannot scale beyond few high priority tenants. Accordingly, system usage may be far less efficient due to the static under/over provisioning of resources.

This may especially be the case given the increase in consolidation, with multiple high priority tenants using shared resources. Additionally, application sensitivity to memory bandwidth and latency may vary a lot by application, tenant, and/or phase of execution. Further, QoS enforcement requirements may likewise vary by application, tenant, and/or phase of execution. Accordingly, it may not be reasonable for a system administrator to be able to estimate these sensitivities, not only by application/tenant, but also by every phase of execution within each tenant/application, and also relative to the load on the system at each of these phases.

Further, existing systems and schemes are typically unaware of the impact of the control variables to measured performance (e.g., cycles per instruction (CPI)). Accordingly, when applied manually and/or a priori, existing solutions may have the real possibility of static under/over provisioning of resources and inefficient usage of system resources.

As will be described in greater detail below, implementations described herein may provide a memory controller to dynamically manage quality of service enforcement and/or migration between local and pooled memory. For example, process sensitivity to memory bandwidth and/or latency may vary greatly from process to process. Also, individual processes may vary greatly in their demands over time. In some examples, hardware may capture information over time to determine patterns of usage and demands. Instead of allocating resources statically to a process, resources may be dynamically reallocated over time as the needs of individual processes change.

For example, implementations described herein may utilize a performance measure based on cycles per instruction (CPI) for level of service enforcement (e.g., service-level agreement (SLA) enforcement). Additionally, implementations described herein may utilize technology hooks, including quality of service hooks, in pooled memory to be able to arbitrate shared resources (in particular arbitration of bandwidth/latency issues. For example, memory QoS hooks may be utilized to guarantee that performance of high priority tenants is not impacted based on measured performance (e.g., cycles per instruction (CPI)).

Implementations described herein may include the usage of performance monitoring (e.g., cycles per instruction (CPI)) to detect what regions are actually being bottlenecked and dynamically decide what regions being accessed by need to be throttled or migrated based on latency or bandwidth. For example, such performance monitoring (e.g., cycles per instruction (CPI)) may be performed via a Top-down Microarchitecture Analysis Method (TMAM) monitor. Such cycles per instruction monitoring may be used to monitor latency bound and bandwidth bound applications.

Additionally, implementations described herein may include page-based memory access tracking to identify cold and warm memory regions. For example, such page-based memory access tracking may identify cold and warm memory regions spatially via access count. In some examples, migration decisions may be based at least in part on such cycles per instruction monitoring (e.g., to identify latency bound and bandwidth bound applications) combined with page-based memory access tracking (e.g., to identify cold and warm memory regions). For example, such migration decisions may be made between pools of memory with different hardware characteristics (e.g., dynamic random access memory (DRAM) or persistent memory (PMEM))

and/or load (high utilization or low utilization). Further, QoS hooks for memory pooling may also be used for finer grained QoS enforcement decisions for memory bandwidth/latency throttling. Such memory bandwidth/latency throttling may be handled on a per application basis, per tenant basis, and/or on a per phase of application execution (e.g., per time window) basis.

FIG. 1 is a block diagram of an example of a pooled memory management system 100 according to an embodiment. As illustrated, the pooled memory management system 100 may include a host processor 102, a memory controller 104, a local memory 106, a performance monitor 108, a Direct Memory Access (DMA) engine 110, an interconnect 112, a pooled memory controller 114, and a remote memory 116.

In some implementations, the pooled memory management system 100 may be part of a server or set of servers, or other computing device. For example, memory controller 104 may be implemented in a first node 101 of a set of servers, while pooled memory controller 114 may be implemented in a second node 113 (or multiple additional nodes) of a set of servers. As used herein, the term "pooled memory" refers to memory shared between several servers connected via interconnect 112 (e.g., COMPUTE EXPRESS LINK (CXL) interconnect). For example, such pooled memory can be carved up and shared between multiple servers. Further, pooled memory may refer to memory that is physically remote (e.g., in another server) but appears as part of the physical address space of a given server. For example, some variants of pooled memory may have different latency and bandwidth characteristics, may or may not include cache coherence to a remote processor that a pooled memory is mapped onto, may include a many-to-one type mapping, the like, or combinations thereof.

In some implementations, the host processor 102 may be a central processing unit (CPU) that includes the memory controller 104 as an integrated memory controller (IMC). For example, the memory controller 104 may be integrated inside a central processing unit (CPU) socket but be distinct from cores of the central processing unit (CPU). In such an example, the host processor 612 and the memory controller 104 may be integrated onto a shared semiconductor die in a system on chip (SoC) architecture, as will be discussed in greater detail below with respect to FIG. 6.

Referring back to FIG. 1, in some implementations, the memory controller 104 may communicate with the local memory 106, the performance monitor 108, the Direct Memory Access (DMA) engine 110, the interconnect 112, and the pooled memory controller 114. For example, the memory controller 104 may communicate with the local memory 106 to track memory page usage on a per application basis. Additionally, the memory controller 104 may communicate with the pooled memory controller 114 to track memory page usage, with respect the remote memory 116, on a per application basis.

In some examples, the tracking of memory page usage may be done on a per tenant basis and/or per various phases of application operation basis in addition or instead of performing the tracking on a per application basis. Additionally or alternatively, the tracking of memory page usage may be done over a period of time to provide predictions based on historical memory page usage for individual applications and/or for individual phases of application operations. For example, historical memory page usage may indicate a significant change in memory page usage when an application transitions from a first phase to a second phase, where the second phase is different than the first phase.

In some implementations, the local memory 106 may be implemented via Persistent Memory (PMEM), the like, and/or combinations thereof. Persistent Memory (PMEM) is a byte addressable write-in-place non-volatile memory. Examples of byte addressable write-in-place non-volatile memory devices include a three dimensional cross-point memory device, single or multi-level Phase Change Memory (PCM) or phase change memory with a switch (PCMS), INTEL OPTANE, non-volatile memory devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. In some embodiments herein, the local memory 106 may be configured as one or more memory modules such as, for example, dual inline memory module (DIMM) channels, and/or the like.

In some implementations, the performance monitor 108 may determines cycles per instruction on a per application basis. For example, the performance monitor 108 may be a Top-down Microarchitecture Analysis Method (TMAM) monitor. In some examples, the performance monitor 108 may determine whether an application is latency bound or bandwidth bound based on the determined cycles per instruction. For example, dependencies of latency and/or bandwidth may be observed with respect to cycles per instruction in processor cores (e.g., in host processor 102 or in other remote processors) to the memory accesses observed in the memory controller 104 and associated processor queues. In some implementations, such dependencies of latency and/or bandwidth with respect to cycles per instruction may be linked to an application level user-specified performance criteria and/or expected performance levels. In such an example, the performance monitor 108 may correlate the application level user-specified performance criteria with the cycles per instruction, which in turn may be used to determine whether a particular application is latency bound or bandwidth bound (e.g., via a Top-down Microarchitecture Analysis Method (TMAM) monitor). In some examples, the performance monitor 108 determines whether an application is latency bound or bandwidth bound when changing from a first phase of the application to a different second phase of the application. The performance monitor 108 an application based on a global process identification. Such a global process identification may include a platform identification and a process address space identification (PASID).

In some implementations, the Direct Memory Access (DMA) engine 110 may be utilized to move data independent of the host processor 102. For example, the Direct Memory Access (DMA) engine 110 may be a Data Structure Accelerator (DSA) engine. In some examples, the memory controller 104 may instruct the Direct Memory Access (DMA) engine 110 to perform a migration from the remote memory 116 to the local memory 106 in response to a determination that the quality of service cannot be enforced. Such a migration may prioritize moving memory pages that were recently accessed within a threshold period of time and/or frequently of accessed within a unit of time.

In some implementations, the interconnect 112 may report bandwidth usage of an application and report available bandwidth to the memory controller 104. For example, the interconnect 112 may be a Cache-Coherent Interconnect, such as a COMPUTE EXPRESS LINK (CXL) interconnect. In some implementations, the interconnect 112 may include one or more queues that are used to buffer and schedule physical traffic through the interconnect 112, and which may be used to monitor the interconnect 112. In some examples, the memory controller 104 may instruct the interconnect 112 to perform quality of service enforcement in response to the reported available bandwidth. As used herein, the term quality of service (QoS) may refer to enforcing some pre-defined notion of fairness between multiple processes all utilizing a shared resource via guard rails to manage any individual process or subset of processes that may starve other processes of resources, such as memory bandwidth.

In some implementations, the pooled memory controller 114 may communicate with the remote memory 116. For example, the pooled memory controller 114 may track memory page usage on a per application basis. Such tracked memory page usage may include when a given memory page was last used, a frequency of access to the given memory page within a unit of time, an identification of what platform was used, and/or an identification of what tenant is associated with the application In some implementations, the remote memory 116 may refer to pooled memory shared between several servers connected via interconnect 112. For example, such pooled memory can be carved up and shared between multiple servers. As used herein, pooled memory may refer to memory shared between several servers connected via interconnect, and may refer to memory that is physically remote (e.g., in another server) but appears as part of the physical address space of a given server. For example, some variants of pooled memory may have different latency and bandwidth characteristics, may or may not include cache coherence to a remote processor that a pooled memory is mapped onto, may include a many-to-one type mapping, the like, or combinations thereof. In some examples, the remote memory 116 may be implemented via Persistent Memory (PMEM), the like, and/or combinations thereof. Persistent Memory (PMEM) is a byte addressable write-in-place non-volatile memory. Examples of byte addressable write-in-place non-volatile memory devices include a three dimensional cross-point memory device, single or multi-level Phase Change Memory (PCM) or phase change memory with a switch (PCMS), INTEL OPTANE, non-volatile memory devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. In some embodiments herein, the remote memory 116 may be configured as one or more memory modules such as, for example, dual inline memory module (DIMM) channels, and/or the like.

In operation, the memory controller 104 may instruct the pooled memory controller 114 to perform a quality of service enforcement. For example, the memory controller 104 may instruct the pooled memory controller 114 and/or the interconnect 112 to perform a quality of service enforcement in response to a determination that an application is latency bound or bandwidth bound. Such a determination that the application is latency bound or bandwidth bound may be based on a cycles per instruction determination supplied by the performance monitor 108.

Additionally or alternatively, the memory controller 104 may instruct the interconnect 112 to perform a quality of service enforcement. For example, the memory controller 104 may instruct the pooled memory controller 114 and/or the interconnect 112 to perform a quality of service enforcement in response to a determination that an application is latency bound or bandwidth bound. Such a determination that the application is latency bound or bandwidth bound may be based on a cycles per instruction determination supplied by the performance monitor 108.

Figure 2:
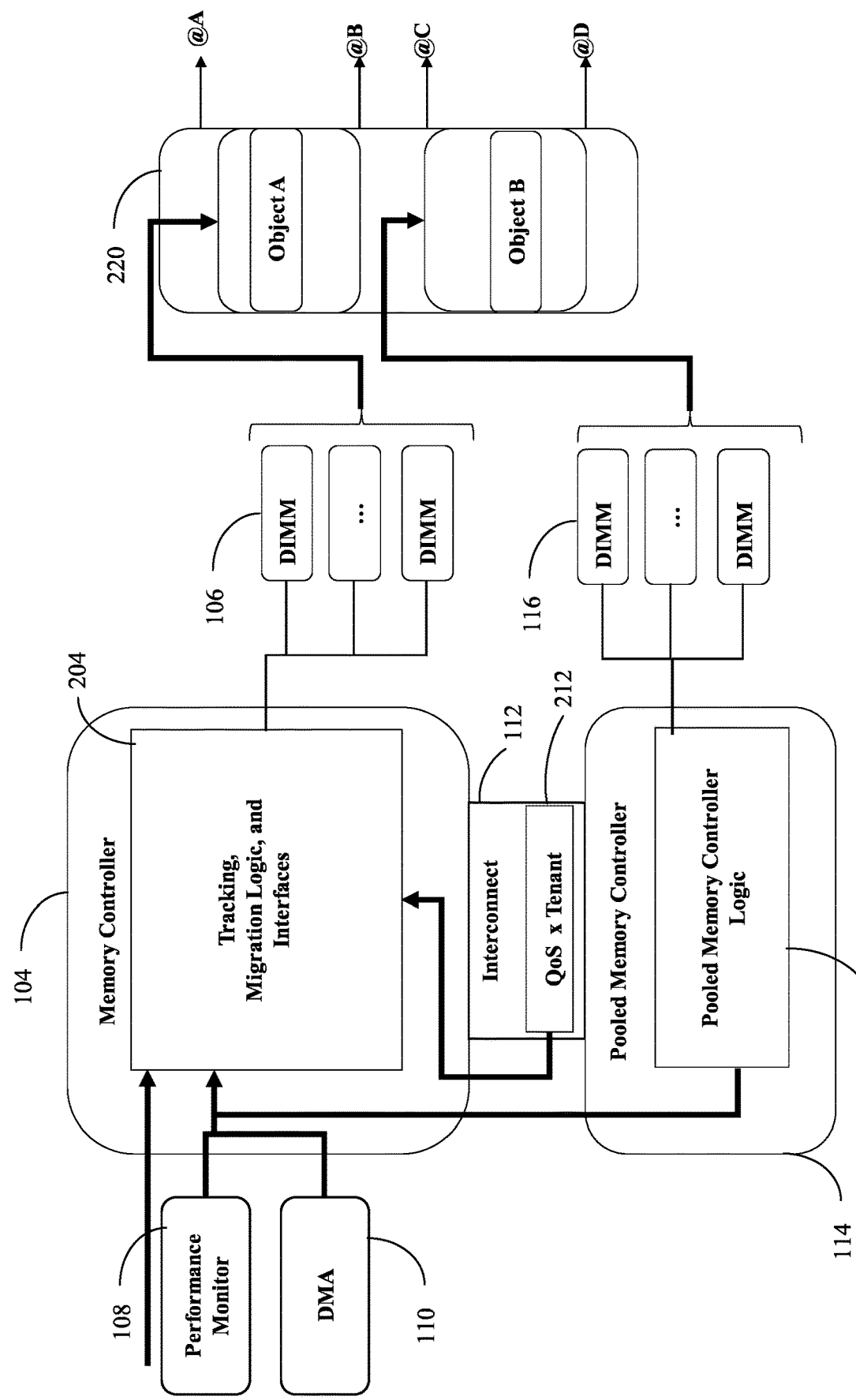
FIG. 2 is an illustration of an example of a memory controller according to an embodiment.

FIG. 2 is an illustration of an example of the memory controller 104 according to an embodiment. As illustrated, the memory controller 104 may include a tracking, migration logic, and interfaces 204. In some implementations, the tracking, migration logic, and interfaces 204 may be exposed to the performance monitor 108 in order to notify that a particular process is being latency or memory bound. Further, the tracking, migration logic, and interfaces 204 may determine what local memory pages are being accessed by each application. In some implementations, the tracking, migration logic, and interfaces 204 may decide whether memory pages from a particular application need to be migrated (e.g.: QoS cannot be enforced and/or there is not enough available bandwidth). Similarly, the tracking, migration logic, and interfaces 204 may decide whether QoS needs to be enforced.

Further, the interconnect 112 may include a QoS by tenant module 212. Interfaces at the interconnect 112 may be exposed in order to allow gathering of telemetry, allow gathering of application bandwidth utilization and available bandwidth, and allow requesting a certain amount of resource QoS enforcement for a particular application or services.

Additionally, the pooled memory controller 114 may include a pooled memory controller logic 214. In some implementations, the pooled memory controller logic 214 may determine what memory pages associated with remote memory 116 are being accessed by each application. For example, the pooled memory controller logic 214 may track per tenant and based on a global process identification. Such a global process identification may include a platform identification and a process address space identification (PASID). Interfaces at pooled memory controller 114 may be exposed in order to allow gathering of telemetry, allow gathering of application bandwidth utilization and available bandwidth, and allow requesting a certain amount of resource QoS enforcement for a particular application or services.

The illustrated implementation may include expanded logic on the architecture of the memory controller 104, the interconnect 112, and/or the pooled memory controller 114. In operation, such expanded logic on the architecture may be used to track local and remote memory pages accessed by each individual application, understand how the application is being affected by the latency and bandwidth to accesses to those memory pages, and to decide whether to migrate some pages from remote memory 116 (e.g., pooled memory and/or any other tiered memory) to a closer memory (e.g., local memory 106).

In one example, a first application may change from Phase 1 to Phase 2 operation (e.g., processing Object A in address space 220). In such an example, the first application may become latency bound. In such an instance, the memory controller 104 may instruct that memory pages that are being more frequently accessed or have been accessed recently (e.g., "hot" memory pages) from Object A may be migrated to local memory.

In another example, the interconnect 112 may be become congested. In such an example, a second application may become bandwidth bound. In response, the memory controller 104 may instruct that QoS enforcement be performed in order to guarantee that the memory pages being accessed have the right level of QoS.

Figure 3:
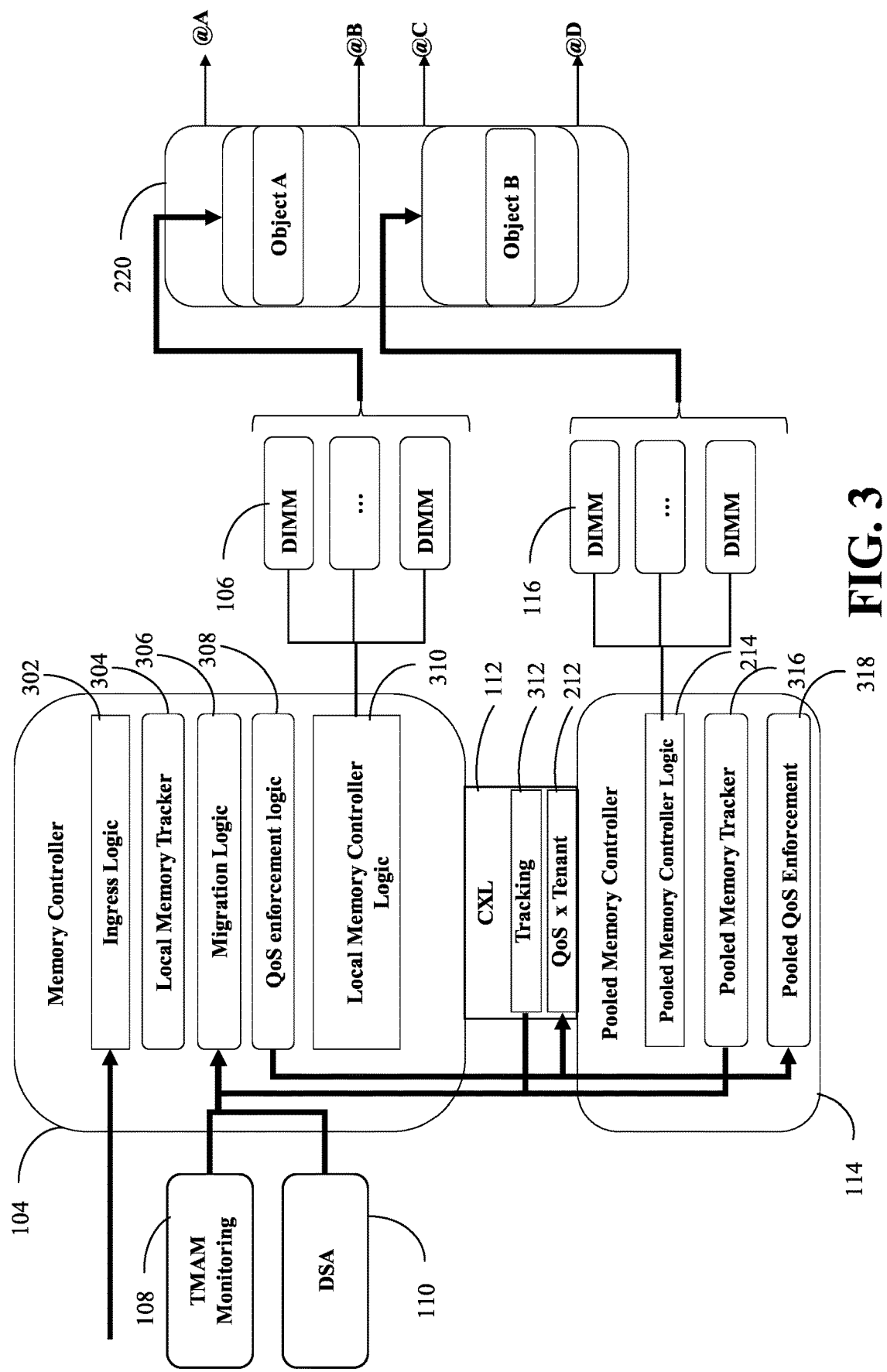
FIG. 3 is an illustration of another example of the memory controller according to an embodiment.

FIG. 3 is an illustration of another example of the memory controller 104 according to an embodiment. As illustrated, the memory controller 104 may be expanded with an interface that is exposed to the performance monitor 108 (e.g., illustrated here as TMAM Monitoring) in order to specify that a particular application has become memory bottlenecked. The memory controller 104 may allow specifying: a type of limitation (e.g., latency bound or bandwidth bound) and a PASID that is affected by that limitation. In some examples, the memory controller 104 may be expanded with logic to perform the migration.

In the illustrated example, the memory controller 104 may include an ingress logic 302, a local memory tracker 304, a migration logic 306, a local QoS enforcement logic 308, and a local memory controller logic 310. For example, the local memory tracker 304 may determine what memory pages are being accessed by each process/application. Interfaces at the interconnect 112 and pooled memory controller 114 may be exposed to migration logic 306 in order to allow the memory controller 104 to gather telemetry, gather application bandwidth utilization information, and gather available bandwidth information. Similarly, interfaces at the interconnect 112 and pooled memory controller 114 may be exposed to QoS enforcement logic in order to allow the memory controller 104 to request a certain amount of resource QoS enforcement for a particular application or services.

In the illustrated example, the performance monitor 108 is implemented via Top-down Microarchitecture Analysis Method (TMAM) monitoring.

In the illustrated example, the Direct Memory Access (DMA) engine 110 may be implemented via a migration engine with an in-built accelerator engine. For example, the Direct Memory Access (DMA) engine 110 may be implemented via a Data Streaming Accelerator (DSA) engine. In some implementations, the Direct Memory Access (DMA) engine 110 may help of the memory migration from a particular memory tier to another one. The Direct Memory Access (DMA) engine 110 may expose an interface to the migration logic 306 to process a list of memory pages to migrate. For each memory page to migrate the memory controller 104 may supply the Direct Memory Access (DMA) engine 110 with the following information: a current memory tier ID (e.g., a local memory tier ID, remote memory tier ID, and/or multiple remote memory tier IDS in cases there are multiple memory pools) and a destination memory tier ID (e.g., where to migrate the memory page). The Direct Memory Access (DMA) engine 110 may include logic to perform the migration requested from the memory controller 104.

In the illustrated example, the interconnect 112 is implemented via a COMPUTE EXPRESS LINK (CXL) interconnect. As illustrated, the interconnect 112 may include a tracking logic 312. In some implementations, the interconnect 112 may expose interfaces that can be used by the memory controller 104 in order to: discover how much bandwidth a particular application represented by a PASID is using, discover how much bandwidth is available in the interconnect 112 and that can be mapped into a particular process, and/or enforce a particular set of resources into the flows of a particular PASID in order to achieve a certain bandwidth.

In the illustrated example, the pooled memory controller 114 may include a pooled memory tracker 316 and a pooled quality of service enforcement 318. In some examples, the pooled memory tracker 316 may determine what memory pages are being accessed by each process/application via remote memory 116 and pass that information to the migration logic 306. For example, the pooled memory tracker 316 may track per tenant and based on a global process identification. Such a global process identification may include a platform identification and a process address space identification (PASID). In some implementations, the pooled memory tracker 316 may be responsible to track per each of the applications (e.g., as may be represented by a global PASID—e.g. a platform ID plus a PASID on the platform). Similarly, the pooled memory tracker 316 may be responsible to track hot memory pages (e.g., the memory pages being recently accessed and/or frequently accessed). For individual applications the pooled memory tracker 316 may report to the memory controller 104 the following information: a tenant ID owning that process, a list of associated memory pages, when a memory page was last used, a memory page frequency of access during the last N units of time, and/or an indication of what platforms a memory page was used from. The pooled memory tracker 316 may provide an interface that can be used by the logic on the memory controller 104 in order to retrieve hot memory pages from a particular process.

In operation, the memory controller 104 may reach out to all the different memory pools and retrieve the list of hot memory pages (e.g., recently access or frequently accessed memory). For individual memory pools, the memory controller 104 may request how much bandwidth is currently utilized for a specific PASID and how much bandwidth can be acquired via QoS enforcement. The memory controller 104 may reach out to the interconnect 112 and perform the same type of information gathering. In response to this information, the migration logic 306 and the QoS enforcement logic 308 may decide whether memory pages from a particular process need to be migrated (e.g.: QoS cannot be enforced—there is not enough available bandwidth). Similarly, the migration logic 306 and the QoS enforcement logic 308 may instead decide whether QoS needs to be enforced. Accordingly, the memory controller 104 may decide whether the memory controller 104 requires an enforcement of a particular resource allocation (e.g. based on the current demand associated with a given PASID that is not being fully served or is starving from latency). In a negative case, the migration logic 306 may reach out to the Direct Memory Access (DMA) engine 110 in order to perform the migration of hotter memory pages from the remote memory 116 pools to local memory 106. If the problem persists migration logic 306 may progressively migrate the memory pages being accessed by the process. In an affirmative case, the QoS enforcement logic 308 may reach out to the pooled memory controller 114 and the CXL interconnect 112 in order to require reallocation of N amount of resources in order to reduce the latency and/or increase the memory bandwidth to one or more of the remote memory 116 pools based on the amount of hot pages and estimated bandwidth available to those remote memory 116 pools.

Figure 4:
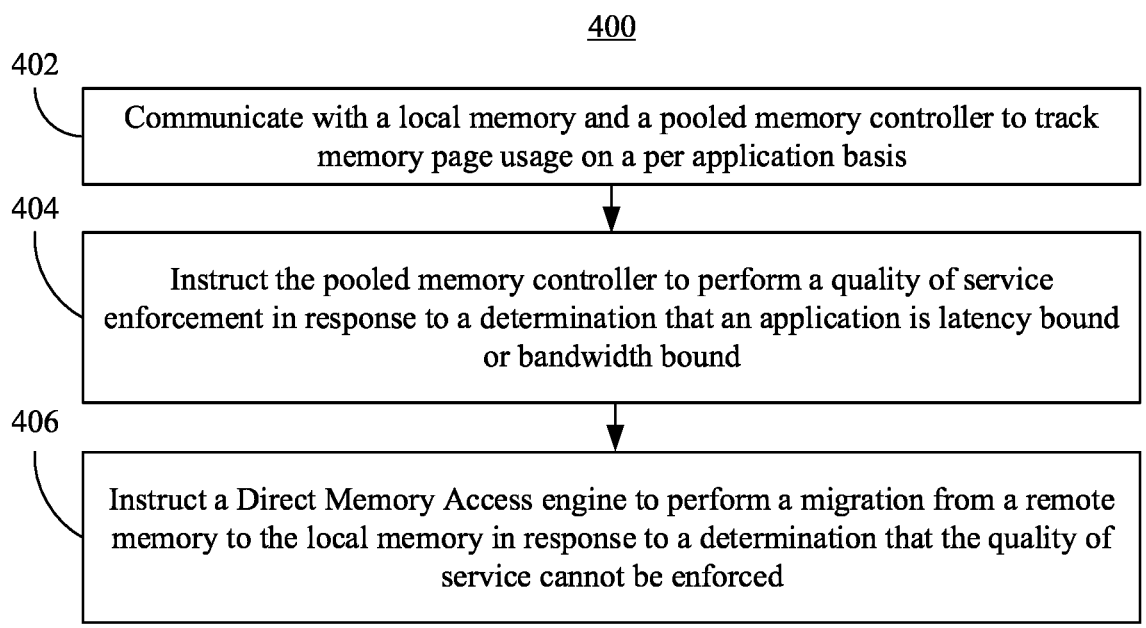
FIG. 4 is a flowchart of an example of a method of operating the pooled memory management system according to an embodiment.

FIG. 4 shows a method 400 of operating pooled memory management system according to an embodiment. The method 400 may generally be implemented in a memory controller, such as, for example, the memory controllers (e.g., see FIGS. 1-3), already discussed.

More particularly, the method 400 may be implemented in one or more modules as a set of logic instructions stored in a machine- or computer-readable storage medium such as random access memory (RAM), ROM, programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 400 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 402 may provide for communicating with a local memory and with a pooled memory controller to track memory page usage on a per application basis. For example, block 402 may provide for communicating with a local memory to track memory page usage on a per application basis for a plurality of applications, via a memory controller.

In some implementations, the tracking of memory page usage may be done on a per tenant basis and/or per various phases of application operation basis in addition or instead of performing the tracking on a per application basis. Additionally or alternatively, the tracking of memory page usage may be done over a period of time to provide predictions based on historical memory page usage for individual applications and/or for individual phases of application operations. For example, historical memory page usage may indicate a significant change in memory page usage when an application transitions from a first phase to a second phase, where the second phase is different than the first phase.

Illustrated processing block 404 may provide for instructing a pooled memory controller to perform a quality of service enforcement. For example, block 404 may provide for instructing, via the memory controller, a pooled memory controller to perform a quality of service enforcement in response to a determination that an application is latency bound or bandwidth bound, wherein the determination that the application is latency bound or bandwidth bound is based on a cycles per instruction determination.

In some implementations, a tracking of performance (e.g., by tracking cycles per instruction itself, latency bound performance, and/or bandwidth bound performance) may be done on a per tenant basis and/or per various phases of application operation basis in addition or instead of performing the tracking on a per application basis. Additionally or alternatively, the tracking of performance may be done over a period of time to provide predictions based on historical performance for individual applications and/or for individual phases of application operations. For example, historical performance may indicate a significant change in memory page usage when an application transitions from a first phase to a second phase, where the second phase is different than the first phase.

Illustrated processing block 406 may provide for instructing a migration be performed from a remote memory to the local memory. For example, block 406 may provide for instructing, via the memory controller, a Direct Memory Access engine to perform a migration from a remote memory to the local memory in response to a determination that the quality of service cannot be enforced.

Additional and/or alternative operations for method 400 are described in greater detail below in the description of FIG. 5.

Figure 5:
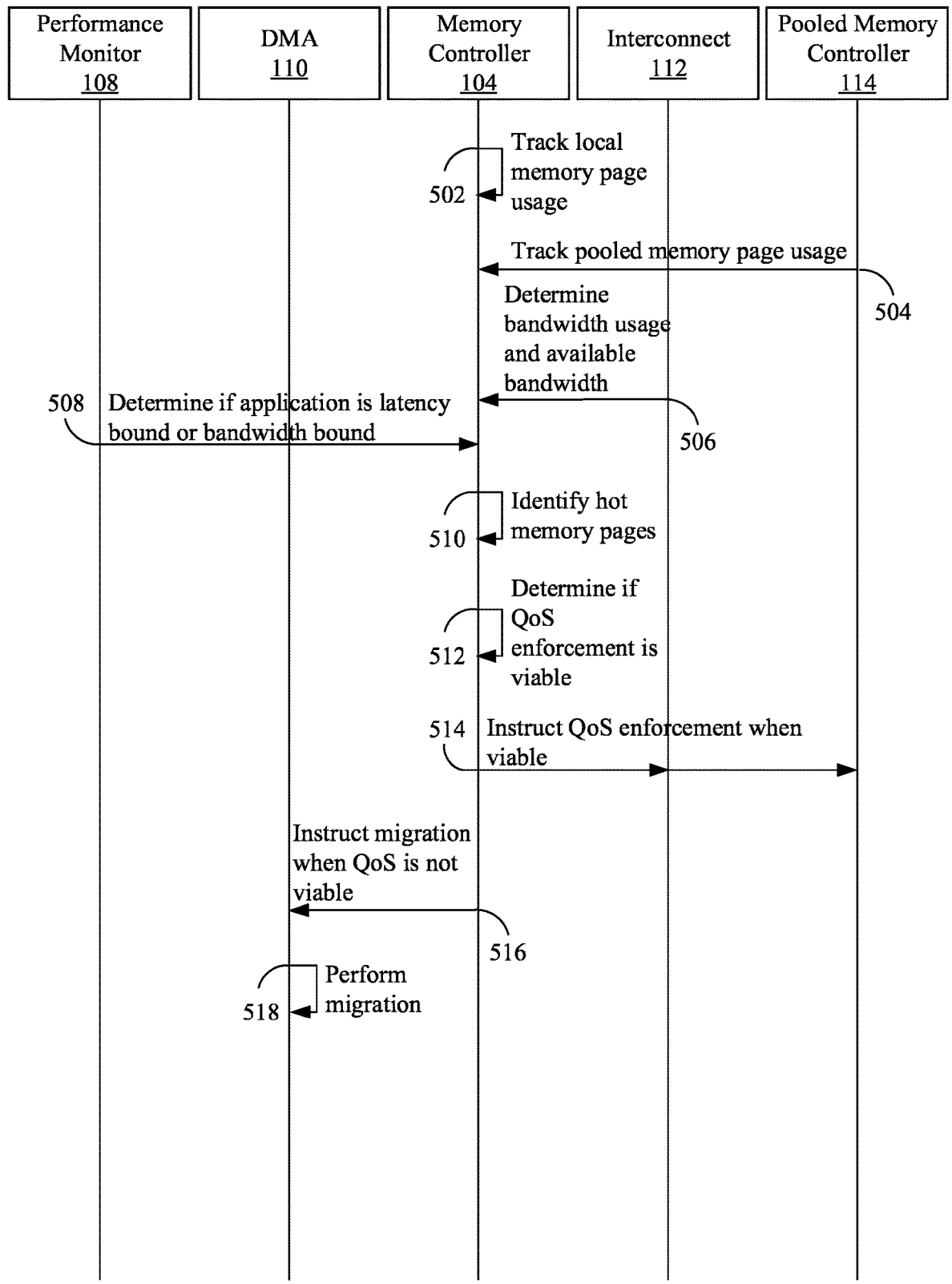
FIG. 5 is a flowchart of an example of another method of operating the pooled memory management system according to an embodiment.

FIG. 5 shows a method 500 of operating pooled memory management system according to an embodiment. The method 500 may generally be implemented in a memory controller, such as, for example, the memory controllers (e.g., see FIGS. 1-3), already discussed.

More particularly, the method 500 may be implemented in one or more modules as a set of logic instructions stored in a machine- or computer-readable storage medium such as random access memory (RAM), ROM, programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 500 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

In the illustrated example, method 500 may be implemented via memory controller 104. As illustrated, memory controller 104 may operate in communication with performance monitor 108, Direct Memory Access (DMA) engine 110, interconnect 112, and/or pooled memory controller 114.

Illustrated processing block 502 may provide for communicating with a local memory to track memory page usage on a per application basis. For example, block 502 may provide for communicating with a local memory to track memory page usage on a per application basis for a plurality of applications, via the memory controller.

Illustrated processing block 504 may provide for communicating with the pooled memory controller to track memory page usage on a per application basis. For example, block 504 may provide for communicating with the pooled memory controller to track memory page usage on a per application basis, via the memory controller. For example, the memory controller may receive information regarding which memory pages the application is utilizing based on a global process identification. Such a global process identification may include a platform identification and a process address space identification (PASID).

In some implementations, the tracking of memory page usage may be done on a per tenant basis and/or per various phases of application operation basis in addition or instead of performing the tracking on a per application basis. Additionally or alternatively, the tracking of memory page usage may be done over a period of time to provide predictions based on historical memory page usage for individual applications and/or for individual phases of application operations. For example, historical memory page usage may indicate a significant change in memory page usage when an application transitions from a first phase to a second phase, where the second phase is different than the first phase.

In some implementations, the tracked memory page usage may include tracking when a given memory page was last used, a frequency of access to the given memory page within a unit of time, an identification of what platform was used, and/or an identification of what tenant is associated with the application.

Illustrated processing block 506 may provide for may provide for determining bandwidth usage and available bandwidth. For example, block 506 may provide for receiving, via the memory controller, latency and bandwidth usage of the plurality of applications and reported available bandwidth from an interconnect. For example, the memory controller may receive information regarding bandwidth the application is utilizing based on a process address space identification (PASID).

In some implementations, the tracking of bandwidth usage may be done on a per tenant basis and/or per various phases of application operation basis in addition or instead of performing the tracking on a per application basis. Additionally or alternatively, the tracking of bandwidth usage may be done over a period of time to provide predictions based on historical bandwidth usage for individual applications and/or for individual phases of application operations. For example, historical bandwidth usage may indicate a significant change in bandwidth usage when an application transitions from a first phase to a second phase, where the second phase is different than the first phase.

Illustrated processing block 508 may provide for determining if an application is latency bound or bandwidth bound. For example, block 508 may provide for the determining if an application is latency bound or bandwidth bound including an identification of when the application has changed from a first phase of the application to a second phase of the application, and where the first phase is different from the second phase.

In some implementations, a tracking of performance (e.g., by tracking cycles per instruction itself, latency bound performance, and/or bandwidth bound performance) may be done on a per tenant basis and/or per various phases of application operation basis in addition or instead of performing the tracking on a per application basis. Additionally or alternatively, the tracking of performance may be done over a period of time to provide predictions based on historical performance for individual applications and/or for individual phases of application operations. For example, historical performance may indicate a significant change in memory page usage when an application transitions from a first phase to a second phase, where the second phase is different than the first phase.

Illustrated processing block 510 may provide for identifying hot memory pages. For example, such hot memory pages may be identified as pages that were recently accessed within a threshold period of time and/or pages that have a frequency of access during the last N units of time (e.g. a frequency above a threshold frequency).

Illustrated processing block 512 may provide for determining if quality of service (QoS) enforcement is viable. For example, block 512 may provide for determining if quality of service (QoS) enforcement is viable, via the memory controller.

In some examples, quality of service (QoS) enforcement viability may be implemented via a scheme where queue slots may be sampled in order to monitor the bandwidth usage of a plurality of applications (e.g., application A with a 70 bandwidth usage, application B with a 30 bandwidth usage, and application C with a 50 bandwidth usage). In such an example, the total available bandwidth might be 150. In a situation where the minimum bandwidth for application A to have acceptable performance is 100, and for application B is 30, and for application C is 40 (e.g., as might be determined by the prediction module 108 correlating memory bandwidth and latency sensitivity/stalls to cycles per instruction measurements), the requirements for all three applications A/B/C cannot be met. Additionally, if all three applications A/B/C are of high priority, one solution may be to migrate application B and/or application C to another memory pool. Additionally or alternatively, another solution maybe to throttle or restrict the bandwidth for a lower priority application.

Illustrated processing block 514 may provide for instructing the pooled memory controller to perform a quality of service enforcement. For example, block 514 may provide for instructing, via the memory controller, the pooled memory controller to perform a quality of service enforcement in response to a determination that an application is latency bound or bandwidth bound, where the determination that the application is latency bound or bandwidth bound is based on a cycles per instruction determination.

Additionally or alternatively, example, block 514 may provide for instructing, via the memory controller, the interconnect (e.g., via queues of the interconnect) to perform a quality of service enforcement in response to the determination that an application is latency bound or bandwidth bound, where the determination that the application is latency bound or bandwidth bound is based on a cycles per instruction determination.

In some implementations, the memory controller may instruct the interconnect to perform quality of service enforcement in response to the reported available bandwidth.

Illustrated processing block 516 may provide for instructing a migration be performed from a remote memory to the local memory. For example, block 516 may provide for instructing, via the memory controller, the Direct Memory Access engine to perform a migration from a remote memory to the local memory in response to a determination that the quality of service cannot be enforced.

In some implementations, the migration may prioritize moving hot memory pages. For example, such hot memory pages may be identified as pages that were recently accessed within a threshold period of time and/or pages that have a frequency of access during the last N units of time (e.g. a frequency above a threshold frequency).

Figure 6:
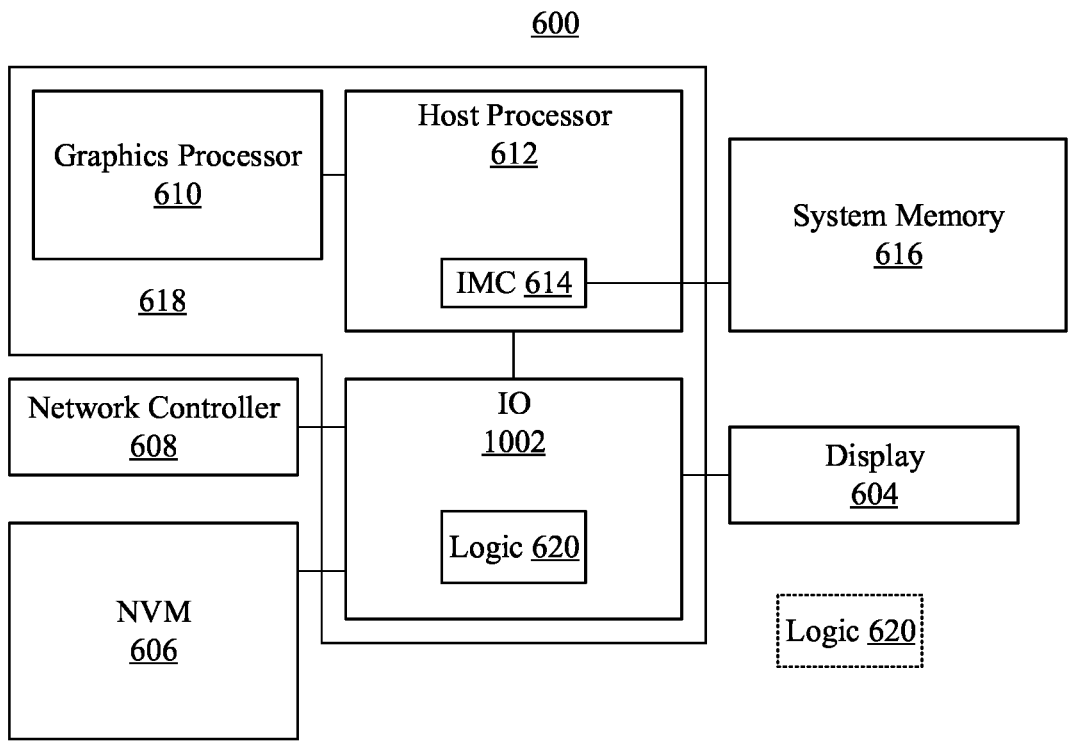
FIG. 6 is a block diagram of an example of a performance-enhanced computing system according to an embodiment.

FIG. 6 shows a performance-enhanced computing system 600. The system 600 may generally implement one or more aspects of the method 400 (FIG. 4) and method 500 (FIG. 5), already discussed. More particularly, the system 600 may be part of a server, desktop computer, notebook computer, tablet computer, convertible tablet, smart television (TV), personal digital assistant (PDA), mobile Internet device (MID), smart phone, wearable device, media player, vehicle, robot, etc., or any combination thereof. In the illustrated example, an input/output (IO) module 602 is communicatively coupled to a display 604 (e.g., liquid crystal display/ LCD, light emitting diode/LED display, touch screen), NVM 606 (e.g., NAND flash memory) and a network controller 608 (e.g., wired, wireless).

The system 600 may also include a graphics processor 610 and a host processor 612 (e.g., central processing unit/CPU) that includes an integrated memory controller (IMC) 614, wherein the illustrated IMC 614 communicates with a system memory 616 over a bus or other suitable communication interface. The host processor 612, the graphics processor 610 and the IO module 602 are integrated onto a shared semiconductor die 618 in a system on chip (SoC) architecture.

The illustrated IO module 602 includes logic 620 (e.g., a memory controller including logic instructions, configurable logic, fixed-functionality hardware logic, etc., or any combination thereof) to implement one or more aspects of the method 400 (FIG. 4) and method 500 (FIG. 5), already discussed. Thus, the logic 620 may communicate with a local memory and with a pooled memory controller to track memory page usage on a per application basis, instruct the pooled memory controller to perform a quality of service enforcement in response to a determination that an application is latency bound or bandwidth bound, wherein the determination that the application is latency bound or bandwidth bound is based on a cycles per instruction determination, and instruct a Direct Memory Access engine to perform a migration from a remote memory to the local memory in response to a determination that the quality of service cannot be enforced.

The illustrated system 600 may be considered to be performance-enhanced to the extent that it may advantageously avoid static a priori provisioning, which typically cannot scale beyond few high priority tenants, and which may be far less efficient due to inherent static under/over provisioning of resources. For example, the illustrated system 600 may advantageously provide a memory controller to dynamically manage quality of service enforcement and/ or migration between local and pooled memory. For example, process sensitivity to memory bandwidth and/or latency may vary greatly from process to process. Also, individual processes may vary greatly in their demands over time. In some examples, hardware may capture information over time to determine patterns of usage and demands. Instead of allocating resources statically to a process, resources may be dynamically reallocated over time as the needs of individual processes change to provide performance-enhanced operations.

In an embodiment, the NVM 606 is mass storage containing a memory structure that may include non-volatile memory. Non-volatile memory is a storage medium that does not require power to maintain the state of data stored by the medium. In one embodiment, the memory structure is a block addressable storage device, such as those based on NAND or NOR technologies. A storage device may also include future generation nonvolatile devices, such as a three-dimensional (3D) crosspoint memory device, or other byte addressable write-in-place nonvolatile memory devices. In one embodiment, the storage device may be or may include memory devices that use silicon-oxide-nitrideoxide-silicon (SONOS) memory, electrically erasable programmable read-only memory (EEPROM), chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The term "storage device" may refer to the die itself and/or to a packaged memory product. In some embodiments, 3D crosspoint memory may comprise a transistor-less stackable cross point architecture in which memory cells sit at the intersection of wordlines and bitlines and are individually addressable and in which bit storage is based on a change in bulk resistance. In particular embodiments, a memory module with non-volatile memory may comply with one or more standards promulgated by the Joint Electron Device Engineering Council (JEDEC), such as JESD218, JESD219, JESD220-1, JESD223B, JESD223- 1, or other suitable standard (the JEDEC standards cited herein are available at jedec.org).

Volatile memory is a storage medium that requires power to maintain the state of data stored by the medium. Examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of the memory modules complies with a standard promulgated by JEDEC, such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at jedec.org). Such standards (and similar standards) may be referred to as DDR-based standards and communication interfaces of the storage devices that implement such standards may be referred to as DDR-based interfaces.

Figure 7:
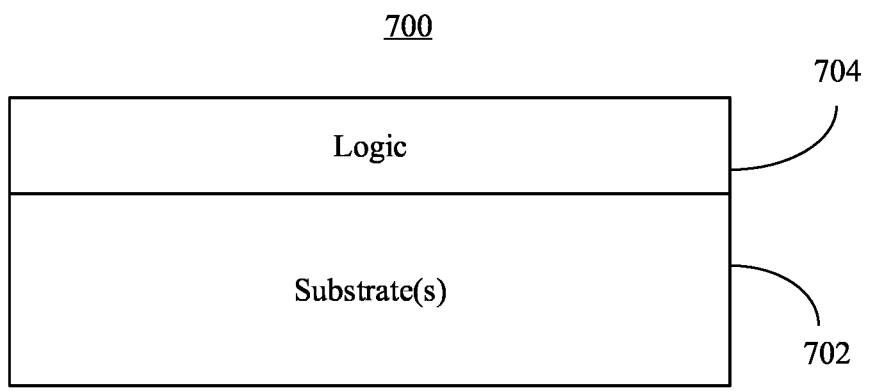
FIG. 7 is an illustration of an example of a semiconductor package apparatus according to an embodiment.

FIG. 7 shows a semiconductor apparatus 700 (e.g., chip, die) that includes one or more substrates 702 (e.g., silicon, sapphire, gallium arsenide) and logic 704 (e.g., a memory controller including transistor array and other integrated circuit/IC components) coupled to the substrate(s) 702. The logic 704, which may be implemented at least partly in configurable logic and/or fixed-functionality hardware logic, may generally implement one or more aspects of the method 400 (FIG. 4) and the method 500 (FIG. 5).

Thus, the logic 704 may communicate with a local memory and with a pooled memory controller to track memory page usage on a per application basis, instruct the pooled memory controller to perform a quality of service enforcement in response to a determination that an application is latency bound or bandwidth bound, wherein the determination that the application is latency bound or bandwidth bound is based on a cycles per instruction determination, and instruct a Direct Memory Access engine to perform a migration from a remote memory to the local memory in response to a determination that the quality of service cannot be enforced.

The illustrated apparatus 700 may be considered to be performance-enhanced to the extent that it may advantageously avoid static a priori provisioning, which typically cannot scale beyond few high priority tenants, and which may be far less efficient due to inherent static under/over provisioning of resources. For example, the illustrated apparatus 700 may advantageously provide a memory controller to dynamically manage quality of service enforcement and/or migration between local and pooled memory. For example, process sensitivity to memory bandwidth and/or latency may vary greatly from process to process. Also, individual processes may vary greatly in their demands over time. In some examples, hardware may capture information over time to determine patterns of usage and demands. Instead of allocating resources statically to a process, resources may be dynamically reallocated over time as the needs of individual processes change to provide performance-enhanced operations.

In one example, the logic 704 includes transistor channel regions that are positioned (e.g., embedded) within the substrate(s) 702. Thus, the interface between the logic 704 and the substrate(s) 702 may not be an abrupt junction. The logic 704 may also be considered to include an epitaxial layer that is grown on an initial wafer of the substrate(s) 702.

Additional Notes and Examples:

Example 1 includes a memory controller including one or more substrates, and a logic coupled to the one or more substrates. The logic is implemented at least partly in one or more of configurable or fixed-functionality hardware logic, the logic to communicate with a local memory and with a pooled memory controller to track memory page usage on a per application basis for a plurality of applications, instruct the pooled memory controller to perform a quality of service enforcement in response to a determination that an application is latency bound or bandwidth bound, where the determination that the application is latency bound or bandwidth bound is based on a cycles per instruction determination, and instruct a Direct Memory Access engine to perform a migration from a remote memory to the local memory in response to a determination that a quality of service cannot be enforced.

Example 2 includes the memory controller of Example 1, where the determination that the application is latency bound or bandwidth bound includes an identification of when the application has changed from a first phase of the application to a second phase of the application, and where the first phase is different from the second phase.

Example 3 includes the memory controller of Example 1, where the logic is to receive information regarding which memory pages the application is utilizing based on a global process identification, and where the global process identification is to include a platform identification and a process address space identification (PASID).

Example 4 includes the memory controller of Example 3, where the migration prioritizes moving memory pages that were recently accessed within a threshold period of time.

Example 5 includes the memory controller of Example 1, where the logic is to receive reported latency and bandwidth usage of the plurality of applications and reported available bandwidth from an interconnect, and instruct the interconnect to perform quality of service enforcement in response to the reported available bandwidth.

Example 6 includes the memory controller of any one of Examples 1 to 5, where the logic is to receive tracked memory page usage on a per application basis from a pooled memory controller, and where the tracked memory page usage includes when a given memory page was last used, a frequency of access to the given memory page within a unit of time, an identification of what platform was used, and an identification of what tenant is associated with the application.

Example 7 includes a system including a processor, a local memory communicatively coupled to the processor, a performance monitor to determine cycles per instruction on a per application basis for a plurality of applications and determine whether an application is latency bound or bandwidth bound based on the determined cycles per instruction, a Direct Memory Access (DMA) engine to move data independent of the host processor, a first memory controller to communicate with a remote memory, where the first memory controller is a pooled memory controller, and a second memory controller. The a second memory controller includes logic to communicate with the local memory and with the pooled memory controller to track memory page usage on a per application basis, instruct the pooled memory controller to perform a quality of service enforcement in response to a determination that an application is latency bound or bandwidth bound, where the determination that the application is latency bound or bandwidth bound is based on a cycles per instruction determination, and instruct the Direct Memory Access engine to perform a migration from a remote memory to the local memory in response to a determination that a quality of service cannot be enforced.

Example 8 includes the system of Example 7, where the performance monitor determines whether the application is latency bound or bandwidth bound when changing from a first phase of the application to a different second phase of the application.

Example 9 includes the system of Example 7, where the performance monitor tracks which memory pages the application is utilizing based on a global process identification, where the global process identification includes a platform identification and a process address space identification (PASID).

Example 10 includes the system of Example 9, where the migration prioritizes moving memory pages that were recently accessed within a threshold period of time.

Example 11 includes the system of Example 7, where the performance monitor includes a Top-down Microarchitecture Analysis Method (TMAM) monitor.

Example 12 includes the system of Example 7, where the Direct Memory Access engine is a Data Streaming Accelerator (DSA) engine.

Example 13 includes the system of Example 7, further including an interconnect to report bandwidth usage of the application and report available bandwidth to the memory controller, where the memory controller instructs the interconnect to perform quality of service enforcement in response to the reported available bandwidth.

Example 14 includes the system of Example 13, where the interconnect includes a Cache-Coherent Interconnect.

Example 15 includes the system of any one of Examples 7 to 14, where the pooled memory controller includes a pooled memory tracker to track memory page usage on a per application basis, where the tracked memory page usage includes when a given memory page was last used, frequency of access to the given memory page within a unit of time, identification of what platform was used, and an identification of what tenant is associated with the application.

Example 16 includes a method including communicating, via a memory controller, with a local memory and with a pooled memory controller to track memory page usage on a per application basis for a plurality of applications, instructing, via the memory controller, the pooled memory controller to perform a quality of service enforcement in response to a determination that an application is latency bound or bandwidth bound, where the determination that the application is latency bound or bandwidth bound is based on a cycles per instruction determination, and instructing, via the memory controller, a Direct Memory Access engine to perform a migration from a remote memory to the local memory in response to a determination that a quality of service cannot be enforced.

Example 17 includes the method of Example 16, where the determination that the application is latency bound or bandwidth bound includes an identification of when the application has changed from a first phase of the application to a second phase of the application, and where the first phase is different from the second phase.

Example 18 includes the method of Example 16, where the memory controller receives information regarding which memory pages the application is utilizing based on a global process identification, and where the global process identification is to include a platform identification and a process address space identification (PASID).

Example 19 includes the method of Example 18, where the migration prioritizes moving memory pages that were recently accessed within a threshold period of time, and further including receiving, via the memory controller, reported latency and bandwidth usage of the plurality of applications and reported available bandwidth from an interconnect, and instructing, via the memory controller, the interconnect to perform quality of service enforcement in response to the reported available bandwidth.

Example 20 includes the method of any one of Examples 16 to 19, further including receiving, via the memory controller, tracked memory page usage on a per application basis from a pooled memory controller, and where the tracked memory page usage includes when a given memory page was last used, a frequency of access to the given memory page within a unit of time, an identification of what platform was used, and an identification of what tenant is associated with the application.

Example 21 includes an apparatus comprising means for performing the method of any one of Examples 19 to 20.

Example 22 includes a machine-readable storage comprising machine-readable instructions which, when executed, implement the method of any one of Examples 19 to 20.

Technology described herein may therefore provide a substantial enhancement to the extent that it may advantageously avoid static a priori provisioning, which typically cannot scale beyond few high priority tenants, and which may be far less efficient due to inherent static under/over provisioning of resources. For example, the technology described herein may advantageously provide a memory controller to dynamically manage quality of service enforcement and/or migration between local and pooled memory. For example, process sensitivity to memory bandwidth and/or latency may vary greatly from process to process. Also, individual processes may vary greatly in their demands over time. In some examples, hardware may capture information over time to determine patterns of usage and demands. Instead of allocating resources statically to a process, resources may be dynamically reallocated over time as the needs of individual processes change to provide performance-enhanced operations.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A memory controller comprising:
one or more substrates; and
a logic coupled to the one or more substrates, where the logic is implemented at least partly in one or more of configurable or fixed-functionality hardware logic, the logic to:
communicate with a local memory and with a pooled memory controller to track memory page usage on a per application basis for a plurality of applications,
instruct the pooled memory controller to perform a quality of service enforcement in response to a determination that an application is latency bound or bandwidth bound, wherein the determination that the application is latency bound or bandwidth bound is based on a cycles per instruction determination, and
instruct a Direct Memory Access engine to perform a migration from a remote memory to the local memory in response to a determination that a quality of service cannot be enforced.

2. The memory controller of claim 1, wherein the determination that the application is latency bound or bandwidth bound includes an identification of when the application has changed from a first phase of the application to a second phase of the application, and wherein the first phase is different from the second phase.

3. The memory controller of claim 1, wherein the logic is to receive information regarding which memory pages the application is utilizing based on a global process identification, and wherein the global process identification is to include a platform identification and a process address space identification (PASID).

4. The memory controller of claim 3, wherein the migration prioritizes moving memory pages that were recently accessed within a threshold period of time.

5. The memory controller of claim 1, wherein the logic is to:
receive reported latency and bandwidth usage of the plurality of applications and reported available bandwidth from an interconnect; and
instruct the interconnect to perform quality of service enforcement in response to the reported available bandwidth.

6. The memory controller of claim 1, wherein the logic is to receive tracked memory page usage on a per application basis from a pooled memory controller, and wherein the tracked memory page usage includes when a given memory page was last used, a frequency of access to the given memory page within a unit of time, an identification of what platform was used, and an identification of what tenant is associated with the application.

7. A system comprising:
a processor;
a local memory communicatively coupled to the processor;
a performance monitor to determine cycles per instruction on a per application basis for a plurality of applications and determine whether an application is latency bound or bandwidth bound based on the determined cycles per instruction;
a Direct Memory Access (DMA) engine to move data independent of the processor;
a first memory controller to communicate with a remote memory, wherein the first memory controller is a pooled memory controller; and
a second memory controller including logic to:
communicate with the local memory and with the pooled memory controller to track memory page usage on a per application basis,
instruct the pooled memory controller to perform a quality of service enforcement in response to a determination that an application is latency bound or bandwidth bound, wherein the determination that the application is latency bound or bandwidth bound is based on a cycles per instruction determination, and
instruct the Direct Memory Access engine to perform a migration from a remote memory to the local memory in response to a determination that a quality of service cannot be enforced.

8. The system of claim 7, wherein the performance monitor determines whether the application is latency bound or bandwidth bound when changing from a first phase of the application to a different second phase of the application.

9. The system of claim 7, wherein the performance monitor tracks which memory pages the application is utilizing based on a global process identification, wherein the global process identification includes a platform identification and a process address space identification (PASID).

10. The system of claim 9, wherein the migration prioritizes moving memory pages that were recently accessed within a threshold period of time.

11. The system of claim 7, wherein the performance monitor comprises a Top-down Microarchitecture Analysis Method (TMAM) monitor.

12. The system of claim 7, wherein the Direct Memory Access engine is a Data Streaming Accelerator (DSA) engine.

13. The system of claim 7, further comprising an interconnect to report bandwidth usage of the application and report available bandwidth to the memory controller, wherein the memory controller instructs the interconnect to perform quality of service enforcement in response to the reported available bandwidth.

14. The system of claim 13, wherein the interconnect comprises a Cache-Coherent Interconnect.

15. The system of claim 7, wherein the pooled memory controller, comprises a pooled memory tracker to track memory page usage on a per application basis, wherein the tracked memory page usage includes when a given memory page was last used, frequency of access to the given memory page within a unit of time, identification of what platform was used, and an identification of what tenant is associated with the application.

16. A method comprising:
communicating, via a memory controller, with a local memory and with a pooled memory controller to track memory page usage on a per application basis for a plurality of applications,
instructing, via the memory controller, the pooled memory controller to perform a quality of service enforcement in response to a determination that an application is latency bound or bandwidth bound, wherein the determination that the application is latency bound or bandwidth bound is based on a cycles per instruction determination, and instructing, via the memory controller, a Direct Memory Access engine to perform a migration from a remote memory to the local memory in response to a determination that a quality of service cannot be enforced.

17. The method of claim 16, wherein the determination that the application is latency bound or bandwidth bound includes an identification of when the application has changed from a first phase of the application to a second phase of the application, and wherein the first phase is different from the second phase.

18. The method of claim 16, wherein the memory controller receives information regarding which memory pages the application is utilizing based on a global process identification, and wherein the global process identification is to include a platform identification and a process address space identification (PASID).

19. The method of claim 18, wherein the migration prioritizes moving memory pages that were recently accessed within a threshold period of time, and further comprising:

receiving, via the memory controller, reported latency and bandwidth usage of the plurality of applications and reported available bandwidth from an interconnect; and instructing, via the memory controller, the interconnect to perform quality of service enforcement in response to the reported available bandwidth.

20. The method of claim 16, further comprising:

receiving, via the memory controller, tracked memory page usage on a per application basis from a pooled memory controller, and wherein the tracked memory page usage includes when a given memory page was last used, a frequency of access to the given memory page within a unit of time, an identification of what platform was used, and an identification of what tenant is associated with the application.

\* \* \* \* \*